United States Patent [19]

Murray

[11] Patent Number: 4,625,758

[45] Date of Patent: Dec. 2, 1986

[54] VALVE ACTUATOR APPARATUS

[75] Inventor: Roy Murray, Brighton, Canada

[73] Assignee: ITT Corporation, New York, N.Y.

[21] Appl. No.: 750,725

[22] Filed: Jun. 28, 1985

[51] Int. Cl.[4] ............................................. F16K 31/50
[52] U.S. Cl. .................................... 137/554; 251/229; 251/368
[58] Field of Search ............... 251/229, 368; 137/554; 464/32, 33

[56] References Cited

U.S. PATENT DOCUMENTS

| | | | |
|---|---|---|---|
| 2,091,745 | 8/1937 | Webb | 251/368 X |
| 2,402,950 | 7/1946 | Culver et al. | 251/368 X |
| 3,007,489 | 11/1961 | Biddle | 137/554 |
| 3,063,298 | 11/1962 | Elliot | 251/229 X |
| 3,430,460 | 3/1969 | Hankinson | 464/33 |
| 3,877,677 | 4/1975 | Daghe et al. | 251/229 X |
| 4,184,345 | 1/1980 | Cutler | 464/32 |
| 4,518,008 | 5/1985 | Fenster et al. | 137/554 X |

Primary Examiner—Martin P. Schwadron
Assistant Examiner—Stephen M. Hepperle
Attorney, Agent, or Firm—John T. O'Halloran

[57] ABSTRACT

A valve actuator is described which employs a hollow housing fabricated from a stamped metal. Located within the housing is a rotatable spindle which spindle is associated with a traveling nut which nut travels along the spindle as the spindle is rotated. The traveling nut has pivotally secured thereto a pivot nut which pivot nut rides in a slot formed in the top portion of a pivot arm. The pivot arm is associated with an aperture to accommodate a valve shaft and pivotally moves when the spindle is rotated due to the movement of the traveling nut along the spindle. The rotation of the pivot arm rotates the valve shaft to thereby open or close an associated valve in a given number of turns as required by the particular system characteristics. Associated with the pivot arm is a switch activator which activator will operate an electrical switch for a given movement of the pivot arm during valve operation. The rotatable spindle is also equipped with an internal (protected) shear pin arrangement, that prevents abuse of the actuator.

1 Claim, 2 Drawing Figures

VALVE ACTUATOR APPARATUS

BACKGROUND OF THE INVENTION

This invention relates to valve actuators in general and more particularly to a valve actuator employing a unique housing configuration and mechanism for operating a water valve or other valve in a reliable and economical manner.

Essentially, the prior art is replete with numerous devices which serve to operate in conjunction with valves to enable the operation of such valves when necessary. In regard to valve actuators, there are many examples of actuators which are employed in various types of systems. For example, in fire protection systems valves may be employed to open a water conduit during a fire or during an emergency. The fire codes require that the opening be relatively slow in that the valve should not be capable of being opened or closed in less than 5 seconds. In any event, many of the valve actuators are associated with additional functions such as the sounding of an alarm when the valve is operated and hence are associated with limit switches. These limit switches must be accurately operated when the valve is operated in order to obtain the above described characteristics.

Valve actuators based on their required operation should be rugged and reliable in operation. As one can ascertain, a valve actuator may not be called upon to operate for extended periods of time. Hence the actuator should be capable of functioning after a long period of non use. Thus the device should be reliable in construction and should be protected against deleterious elements in the environment so as not to rust or jam or otherwise deteriorate with age.

Based on the prior art, many valves were made by machining processes which utilized relatively expensive materials such as cast iron or stainless steel. In this manner the valve bodies were cast and then machined to required dimensions. Thus the prior art fabrication of valve actuators resulted in a relatively expensive component. Based on the type of materials that were utilized, the actuators had to be constantly maintained in regard to lubrication of the same and in general in regard to a predetermined maintenance plan where the valve actuator would constantly be tested to assure that they would operate when required to do so.

It is, therefore, an object of the present invention to provide a valve actuator which is simple, inexpensive and rugged in construction.

The valve actuator to be described includes a pivot arm which is contained in a stamped metal housing. The pivot arm as will be explained is associated with a pivot nut which causes the arm to pivot upon actuation of a spindle. Based on the construction, the resultant valve actuator is extremely rugged, requires very little machining and hence is relatively inexpensive while being extremely reliable in operation.

BRIEF DESCRIPTION OF THE PREFERRED EMBODIMENT

A valve actuator apparatus, comprising a first housing section having a closed bottom surrounded by extending sidewalls, with an opened top, a spindle member positioned between opposite sidewalls and rotatably secured to said housing section, a traveling nut member coupled to said spindle member and adapted to move along said spindle member when said spindle member is rotated, a pivot nut pivotally secured to said travel nut and adapted to move with said travel nut, a pivot arm having a first pivot end coupled to said housing and adapted to accommodate a valve shaft, and having a second slotted end, with said slot positioned about said pivot nut to cause said arm to pivot as said pivot nut moves according to the rotation of said spindle member to thereby rotate said valve shaft from a first to a second position.

DETAILED DESCRIPTION OF THE DRAWINGS

Figure 1:
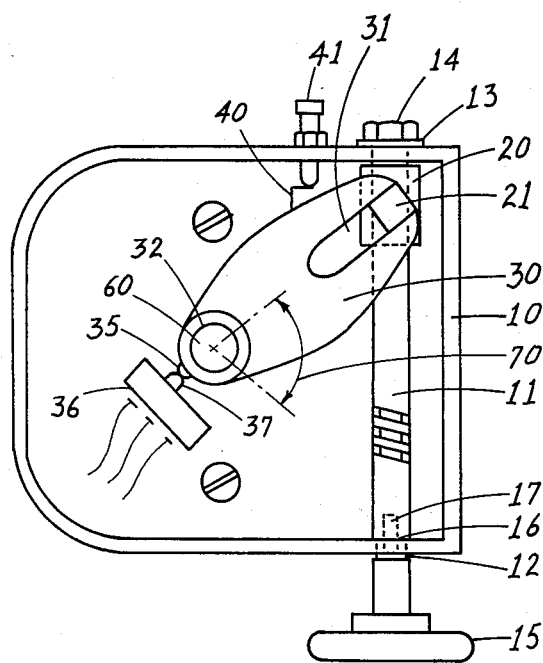
FIG. 1 is a top plan view of a valve actuator apparatus according to this invention.

Referring to FIG. 1, there is shown a top plan view with the cover removed of a valve operator or valve actuator according to this invention.

Reference numeral 10 refers to a valve body which as will be explained consists of a housing having a closed bottom surrounded by side walls to form an internal hollow. The housing 10 is fabricated from stamped sheet metal which, therefore, produces a finished part requiring very little machining.

Located within the housing is a spindle 11. The spindle 11 essentially is a threaded member which is positioned between apertures 12 and 13 within the housing 11. The spindle is captured at one end by means of a nut 14 and at the other end the spindle is secured to an operating handle 15 which handle is inserted into the spindle via an aperture 16. Secured to the handle section is a shear pin 17. The shear pin 17 serves to prevent excessive forces from being applied to the spindle body. If an excessive force is applied to the spindle body then the shear pin shears and hence prevents further rotation of the spindle. The spindle 11 is fabricated from a high strength bronze material and basically is a machined part.

Movably secured to the spindle 11 is a traveling nut 20. The nut 20 has coupled to the top surface thereof a pivot nut 21. Shown in the Figure is a pivot arm 30. The pivot arm 30 is fabricated form a high strength powdered metal material that is produced by a casting or other stamping process. As is seen in FIG. 1, the pivot arm 30 has an elongated front slot 31 which front slot coacts with the pivot nut 21 with the sides of the slot abutting against opposite surfaces of the pivot nut. The pivot arm is pivotally secured to the housing at a pivot location 32 and is associated with a shaft 60 which shaft eventually is coupled to a valve body as will be further eplained. The pivot arm has an extending projection 35 which projection is utilized to activate a microswitch 36 during pivotal movement of the arm 30.

The microswitch is associated with an actuator 37 which when released by the pivot arm will close the output contacts of the switch to thereby control various alarms or other external circuits. Located on the top surface of the pivot arm 30 is a ridge 40. The ridge 40 abuts against the bottom surface of a travel adjustment screw 41. As one can see, adjustment of the screw 41 controls the movement of the pivot arm.

Figure 2:
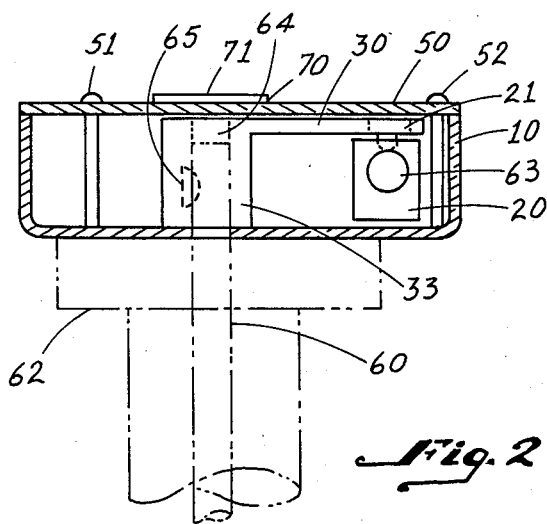
FIG. 2 is a partial cross sectional showing the valve actuator of FIG. 11 coupled to a valve shaft.

Referring to FIG. 2, there is shown a cross sectional view to more clearly show the structure. The valve housing body 10 is associated with a cover member 50 which cover member is also stamped from sheet metal. The cover member has a series of apertures located thereon to accomodate hold-down screws as 51 and 52 to secure the cover 50 to the housing 10.

The pivot arm 30 as seen in FIG. 2 has the pivot end internal aperture which aperture is coupled to the shaft 60 of a valve. The valve body 62 is secured to the underside of the housing 10 as shown in FIG. 1 with the valve shaft 60 extending into the aperture 64 of the pivot arm 30. As can be seen from FIG. 2, the traveling nut 20 has an aperture 63 which surrounds the surface of the spindle 11. The slot 31 of the pivot arm is coupled to the pivot nut 21 as shown. The valve shaft 60, once inserted into aperture 64, is held firmly in place by means of a key 65 which may contain a screw or other device for firmly securing the valve shaft 60 to the pivot arm 30.

As can be seen from FIGS. 1 and 2, upon rotation of the spindle 11 by means of the handle 15 the traveling nut will move along the spindle causing the pivot nut to ride in the slot 31 of the pivot arm. The pivot nut which is rotatably mounted on the traveling nut pushes the pivot arm 31 to cause it to pivot in the directions indicated by arrow 70 of FIG. 1. This in turn rotates the valve shaft 60 which, therefore, opens and closes the valve. When the pivot arm rotates a predetermined distance which is indicative of the valve opening, the projection 35 releases the switch activator 37 to cause the switch to operate. If too much force is applied or if one attempts to lock the spindle then the shear pin 17 will break thus preventing further operation of the actuator. As can be seen from the above, the valve actuator is extremely simple in operation and is relatively inexpensive to manufacture. The valve actuator can be employed with a quarter turn valve of the type utilized in fire protection systems which as indicated require a slow opening.

As one can see, based on the structure the thread associated with the spindle will determine the number of rotations required to move the pivot arm so that it can in turn operate the valve. The switch 36 operates as a limit switch whose contacts can be employed to sound alarms or to operate other units such as relays and so on. The spindle 11 is fabricated from a high strength bronze material and essentially is its own bearing material and hence serves as a lubricant for the travel nut which is machined from steel bar stock.

As one can see, there are no bushings required, and hence this eliminates a very expensive part which is found in most prior art valve actuators. Since the travel nut 20 and the pivot nut 21 are made from steel, these are easily available components. The pivot arm 30 as indicated is made from a powdered material such as iron which is infiltrated with copper and hence the pivot arm also self-lubricates the pivot nut hereby eliminating the need for lubrication between the pivot arm and the pivot nut. Essentially, the above described valve is extremely simple to construct and is relatively inexpensive. The device is relatively rugged due to the fact that the housing 10 as well as the top cover plate are fabricated from a stamped sheet metal thereby eliminating casted housings as employed in the prior art.

Also shown in FIG. 2 is a section of the pivot arm 30 extending through the top cover plate 50 via an aperture 70. The extending section of the pivot arm is coupled to a valve position indicator 71 which essentially provides a visual indication of the distance the pivot arm travels indicating to a user the extent of the valve opening.

Based on the above description, the device is extremely reliable and can be dormant for long periods of time without one having to worry about lubrication or excessive maintenance as the device will operate when called upon even after extended periods of non-use.

I claim:

1. A valve actuator apparatus, comprising:
    a housing section having a closed bottom surrounded by extending sidewalls with an opened top and fabricated from a sheet metal material,
    a cover member of a planar configuration stamped from a sheet metal material for covering said opened top of said housing section and means for coupling said cover member to said housing section,
    a spindle member fabricated from bronze and positioned between opposite sidewalls and rotatably secured to said housing section, with one end extending from said housing, a handle coupled to said spindle member at said one end via shear means operative to rupture when excessive forces are applied to said spindle to thereby disconnect said handle from said spindle during the application of an excessive force,
    a traveling nut member fabricated from steel coupled to said spindle member and adapted to move along said spindle member when said spindle member is rotated, with said bronze spindle member self-lubricating said steel travel nut member,
    a steel pivot nut pivotally secured to said travel nut and adapted to move with said travel nut,
    a pivot arm fabricated from powdered iron infiltrated with copper and having a first pivot end coupled to said housing and adapted to accommodate a valve shaft, and having a second slotted end with said slot positioned about said pivot nut to cause said arm to pivot as said pivot nut moves according to the rotation of said spindle member to thereby rotate said valve shaft from a first to a second position, with said powdered iron pivot arm, self-lubricating pivot nut, said pivot arm having a projection extending from said first pivot end,
    switching means located in said housing section and having a movable switch actuator plunger which when pushed inwardly places said switching means in a first non-operative state and which when released, places said switching means in a second operative state, with said switch actuator contacting said projection to push the same inwardly and to do so during rotation of said shaft from said first to said second position and to move out of contact and therefore release said actuator when said valve shaft is in said second position to thereby operate said switching means in said second position only when said projection releases said actuator.

* * * * *